United States Patent
Matsenko

(10) Patent No.: US 10,880,308 B1
(45) Date of Patent: *Dec. 29, 2020

(54) INTEGRATED SYSTEM COMPONENT AND ELECTRONIC DEVICE

(71) Applicant: Vivint, Inc., Provo, UT (US)

(72) Inventor: Igor Matsenko, Sandy, UT (US)

(73) Assignee: Vivint, Inc., Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/524,434

(22) Filed: Jul. 29, 2019

Related U.S. Application Data

(63) Continuation of application No. 15/215,562, filed on Jul. 20, 2016, now Pat. No. 10,367,812.

(51) Int. Cl.
*H04L 29/06* (2006.01)
*G06F 1/3287* (2019.01)
*H04L 12/28* (2006.01)
*H04L 12/10* (2006.01)
*H04L 29/08* (2006.01)

(52) U.S. Cl.
CPC ........ *H04L 63/0876* (2013.01); *G06F 1/3287* (2013.01); *H04L 12/10* (2013.01); *H04L 12/2803* (2013.01); *H04L 67/125* (2013.01); *H04L 2012/2843* (2013.01)

(58) Field of Classification Search
CPC .............. H04L 12/2818; H04L 12/282; H04L 12/2803; H04L 12/2827; G02B 6/3825; G02B 6/3895; H01R 13/665; H01R 24/76; G05B 2219/163
See application file for complete search history.

(56) References Cited

U.S. PATENT DOCUMENTS

| | | | |
|---|---|---|---|
| 8,340,975 B1 | 12/2012 | Rosenberger | |
| 8,825,020 B2 | 9/2014 | Mozer et al. | |
| 2001/0025349 A1* | 9/2001 | Sharood | G06Q 30/0235 713/340 |
| 2005/0184867 A1* | 8/2005 | Osann, Jr. | G05B 15/02 340/539.25 |
| 2013/0183944 A1* | 7/2013 | Mozer | H04L 12/282 455/414.1 |
| 2014/0067137 A1* | 3/2014 | Amelio | H03K 17/00 700/286 |
| 2015/0162006 A1* | 6/2015 | Kummer | H04N 21/47217 704/275 |
| 2015/0241860 A1* | 8/2015 | Raid | G05B 15/02 700/275 |

FOREIGN PATENT DOCUMENTS

| | | | | |
|---|---|---|---|---|
| EP | 0994536 A1 * | 4/2000 | ........... | H01R 31/065 |
| EP | 0994536 A1 * | 4/2000 | ........... | H01R 31/065 |
| WO | WO2013019394 A1 | 2/2013 | | |
| WO | WO2014144419 A1 | 9/2014 | | |

* cited by examiner

*Primary Examiner* — Mirza F Alam
(74) *Attorney, Agent, or Firm* — Holland & Hart, LLP

(57) ABSTRACT

A computer-implemented method for implementing an integrated device includes operating a component of a security and/or automation system, wherein the component is housed with an electronic device that is connected to electrical wiring of a building, communicating between the component and a control panel of the security and/or automation system, and providing power to the component and the electronic device through the electrical wiring.

18 Claims, 13 Drawing Sheets

INTEGRATED SYSTEM COMPONENT AND ELECTRONIC DEVICE

CROSS REFERENCE

The present application us a continuation of U.S. patent application Ser. No. 15/215,562, filed Jul. 20, 2016, and titled "INTEGRATED SYSTEM COMPONENT AND ELECTRONIC DEVICE", which is assigned to the assignee hereof. The disclosure of this reference is incorporated herein in its entirety by this reference.

BACKGROUND

The present disclosure, for example, relates to security and/or automation systems, and more particularly to integrated components for use in security and/or automation system, such as voice control components that are integrated into already existing electronic equipment to provide power and/or communication abilities.

Security and automation systems are widely deployed to provide various types of communication and functional features such as monitoring, communication, notification, and/or others. These systems may be capable of supporting communication with a user through a communication connection or a system management action.

With the wide-spread use of computers and mobile devices has come an increased presence of automation and security products. Automation and security products can fully automate aspects of a residence and/or business. In some embodiments, the automation system may require one of more devices to be spread throughout a building to automate aspects of the home and/or business.

In some instances, the devices may require power. Powering the devices may require running new electronic equipment (e.g., electrical wiring) through a building.

SUMMARY

The present disclosure is directed to components of security and/or automation systems, and particularly such components that are integrated with an electronic device that is connected to electrical wiring of a building (e.g., home or commercial building). In at least some examples, the integrated device is stored in a electrical box such as an electrical outlet box or an electrical switch box that is permanently mounted in a wall of the building, and the electronic device may be an electrical outlet or an electrical switch, respectively.

The component may be communicate with a control panel of the security and/or automation system. In some examples, the control panel processes information and/or data provided by the component. The control panel may transmit instructions to another component of the security and/or automation system or the electronic device in response to the processed information/data. In other examples, the control panel settings or functions of the control panel are modified in response to the information/data received from the component. For example, the information received from the component may be an audible message (or data representing an audible message) received at the component to adjust a thermostat setting or activate an armed state for the security and/or automation system.

In other embodiments, the component may be coupled in to a similar second component that is positioned in a different room of the building. The information/data received at one component may be routed directly to the second component, or routed through the control panel. In one example, the information transmitted is an audible message, and the components operate as an intercom system. Each component may include at least one of a microphone and speaker to facilitate the audible communications.

In one embodiment, a computer-implemented method for implementing an integrated device includes operating a component of a security and/or automation system, wherein the component is housed with an electronic device that is connected to electrical wiring of a building, communicating between the component and a control panel of the security and/or automation system, and providing power to the component and the electronic device through the electrical wiring.

In one example, the component may include a speaker and a microphone, and communicating includes transmitting an audio message. The electronic device may be one of a power outlet and a light switch, and the component may be integrated into a common housing with the electronic device. The method may include receiving voice commands via the component. The component may include at least one sensor, and the method may further include operating the electronic device in response to sensor data received from the sensor. The component may include at least one of a camera, a motion sensor, a microphone, a speaker, an infrared sensor, a microprocessor, memory, a wireless transmitter, and a wireless receiver. Communicating may include transmitting data through the electrical wiring. Communicating may include transmitting data wirelessly. The method may further include communicating with another component of the security and/or automation system either wirelessly or through the electrical wiring.

A further embodiment is directed to an apparatus for security and/or automation systems. The apparatus includes a processor, memory in electronic communication with the processor, and instructions stored in the memory. The instructions are executable by the processor to operate a component of a security and/or automation system, wherein the component is housed with an electronic device that is connected to electrical wiring of a building, communicate between the component and another component of the security and/or automation system, and provide power to the component and the electronic device through the electrical wiring.

In one example, the instructions may be further executable by the processor to communicate between the component and the another component via a control panel of the security and/or automation system. The component may include a microphone and a speaker and is operable as an intercom device. The instructions may be further executable by the processor to communicate between the component and the another component wirelessly. The instructions may be further executable by the processor to communicate between the component and the another component over the electrical wiring. The instructions may be further executable by the processor to conduct voice recognition using audio data received at the component. The instructions may be further executable by the processor to operate the component in a sleep mode until identification of a trigger event. The instructions may be further executable by the processor to control one or more functions of the security and/or automation system via instructions input at the component. The instructions may be further executable by the processor to control power supply to the electronic device in response to operation of the component. The component and electronic device may be mounted in an electrical box that is positioned in a wall of the building.

Another embodiment is directed to a non-transitory computer-readable medium storing computer-executable code for security and/or automation systems. The code is executable by a processor to communicate between a component and a control panel of the security and/or automation system through at least one of electrical wiring of a building and a wireless communication medium, wherein the component is housed with an electronic device that is connected to the electrical wiring, and provide power to the component and the electronic device through the electrical wiring.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

DETAILED DESCRIPTION

In some embodiments, a security and/or automation system component, such as a sensor, microphone, speaker, camera, or user interface may require power and the ability to communicate with a central device of the security and/or automation system such as control panel. Sometimes, installing the sensors and/or components may require running new electrical lines and/or communication lines to such components. The present disclosure relates to systems and methods for powering a component of a security and/or automation system by installing the component into already existing infrastructure (e.g., existing electrical wiring) to ensure continuous power.

The component may be installed in one or more existing electrical connections in a building. For example, the component may be installed in one or more electrical outlet, light switch or other type of electrical box of a building. The component may be retrofitted into existing electrical equipment, or may be integrated into an electronic device that replaces existing electrical equipment. For example, an integrated component and electronic device may be wired to appear as an electrical outlet and may function as an electrical outlet, but may additionally comprise one or more capabilities associated with a security and/or automation system (e.g., sensing and/or monitoring capabilities, and the like).

The sensing and/or monitoring capabilities may comprise, for example, a components such as a camera, a motion detector, a smoke detector, an audio detector, a temperature sensor, and the like. In some instances, the component and/or integrated device may automate a function of the security and/or automation system. For example, microphone and speaker components may be housed in a common housing with an electronic device and operate to control one or more aspects of the security and/or automation system via voice control. The speaker component may allow the security and/or automation system to respond in kind to one or more commands received from the user via the microphone. In further embodiments, the microphone and speaker components may additionally operate as one or more intercoms in a building or property monitored by a security and/or automation system.

The following description provides examples and is not limiting of the scope, applicability, and/or examples set forth in the claims. Changes may be made in the function and/or arrangement of elements discussed without departing from the scope of the disclosure. Various examples may omit, substitute, and/or add various procedures and/or components as appropriate. For instance, the methods described may be performed in an order different from that described, and/or various steps may be added, omitted, and/or combined. Also, features described with respect to some examples may be combined in other examples.

Figure 1:
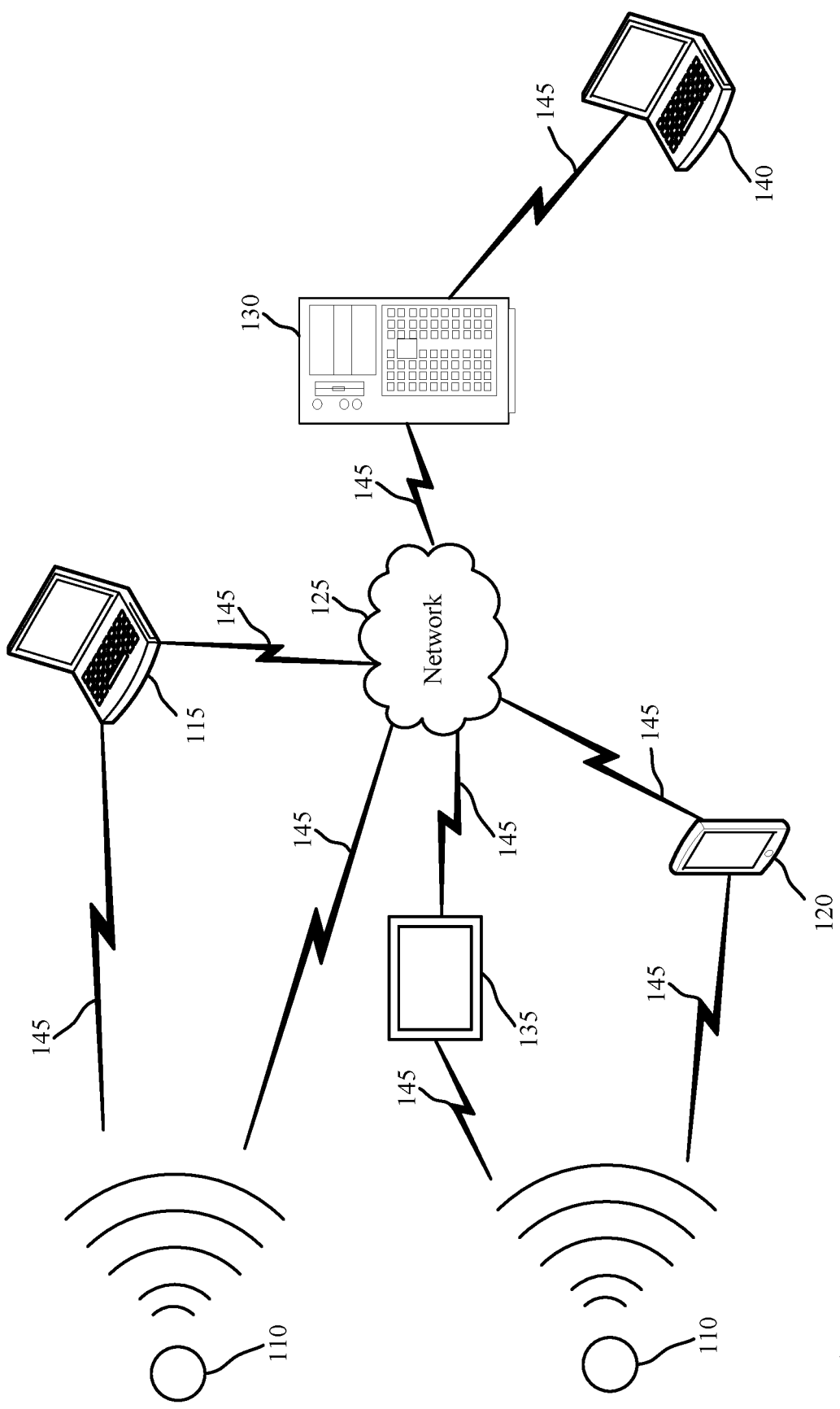
FIG. 1 is a block diagram of an example of a security and/or automation system in accordance with various embodiments.

FIG. 1 is an example of a communications system 100 in accordance with various aspects of the disclosure. In some embodiments, the communications system 100 may include one or more sensor units 110, local computing device 115, 120, network 125, server 130, control panel 135, and remote computing device 140. One or more sensor units 110 may communicate via wired or wireless communication links 145 with one or more of the local computing device 115, 120 or network 125. The network 125 may communicate via wired or wireless communication links 145 with the control panel 135 and the remote computing device 140 via server 130. In alternate embodiments, the network 125 may be integrated with any one of the local computing device 115, 120, server 130, or remote computing device 140, such that separate components are not required.

Local computing device 115, 120 and remote computing device 140 may be custom computing entities configured to interact with sensor units 110 via network 125, and in some embodiments, via server 130. In other embodiments, local computing device 115, 120 and remote computing device 140 may be general purpose computing entities such as a personal computing device, for example, a desktop computer, a laptop computer, a netbook, a tablet personal computer (PC), a control panel, an indicator panel, a multi-site dashboard, an iPod®, an iPad®, a smart phone, a mobile phone, a personal digital assistant (PDA), and/or any other suitable device operable to send and receive signals, store and retrieve data, and/or execute modules.

Control panel 135 may be a smart home system panel, for example, an interactive panel mounted on a wall in a user's home. Control panel 135 may be in direct communication via wired or wireless communication links 145 with the one or more sensor units 110, or may receive sensor data from the one or more sensor units 110 via local computing devices 115, 120 and network 125, or may receive data via remote computing device 140, server 130, and network 125.

The local computing devices 115, 120 may include memory, a processor, an output, a data input and a communication module. The processor may be a general purpose processor, a Field Programmable Gate Array (FPGA), an Application Specific Integrated Circuit (ASIC), a Digital Signal Processor (DSP), and/or the like. The processor may be configured to retrieve data from and/or write data to the memory. The memory may be, for example, a random access memory (RAM), a memory buffer, a hard drive, a database, an erasable programmable read only memory (EPROM), an electrically erasable programmable read only memory (EEPROM), a read only memory (ROM), a flash memory, a hard disk, a floppy disk, cloud storage, and/or so forth. In some embodiments, the local computing devices 115, 120 may include one or more hardware-based modules (e.g., DSP, FPGA, ASIC) and/or software-based modules (e.g., a module of computer code stored at the memory and executed at the processor, a set of processor-readable instructions that may be stored at the memory and executed at the processor) associated with executing an application, such as, for example, receiving and displaying data from sensor units 110.

The processor of the local computing devices 115, 120 may be operable to control operation of the output of the local computing devices 115, 120. The output may be a television, a liquid crystal display (LCD) monitor, a cathode ray tube (CRT) monitor, speaker, tactile output device, and/or the like. In some embodiments, the output may be an integral component of the local computing devices 115, 120. Similarly stated, the output may be directly coupled to the processor. For example, the output may be the integral display of a tablet and/or smart phone. In some embodiments, an output module may include, for example, a High Definition Multimedia Interface™ (HDMI) connector, a Video Graphics Array (VGA) connector, a Universal Serial Bus™ (USB) connector, a tip, ring, sleeve (TRS) connector, and/or any other suitable connector operable to couple the local computing devices 115, 120 to the output.

The remote computing device 140 may be a computing entity operable to enable a remote user to monitor the output of the sensor units 110. The remote computing device 140 may be functionally and/or structurally similar to the local computing devices 115, 120 and may be operable to receive data streams from and/or send signals to at least one of the sensor units 110 via the network 125. The network 125 may be the Internet, an intranet, a personal area network, a local area network (LAN), a wide area network (WAN), a virtual network, a telecommunications network implemented as a wired network and/or wireless network, etc. The remote computing device 140 may receive and/or send signals over the network 125 via communication links 145 and server 130.

In some embodiments, the one or more sensor units 110 may be sensors configured to conduct periodic or ongoing automatic measurements related to receiving voice commands. Each sensor unit 110 may be capable of sensing one or more voice command parameters, or alternatively, separate sensor units 110 may monitor separate voice command parameters. For example, one sensor unit 110 may monitor for spoken voice commands, while another sensor unit 110 (or, in some embodiments, the same sensor unit 110) may detect motion or other parameters to assess presence of one or more persons in a monitored space. In alternate embodiments, a user may input data directly at the local computing device 115, 120 or at remote computing device 140. For example, a user may enter instructions for controlling the sensor units 110 or for processing data received from sensor units 110. In one example, the data received from sensor units 110 includes voice commands for controlling operation of control panel 135. In another example, the data received from sensor units 110 is audio data representing an audio message to be transferred to another area of the property (e.g., local computing device 115, 120) or to a remote device (e.g., remote computing device 140 or a remotely positioned speaker in another area of the monitored property).

Data gathered by the one or more sensor units 110 may be communicated to local computing device 115, 120, which may be, in some embodiments, a thermostat or other wall-mounted input/output smart home display or functional component of a security and/or automation system. In other embodiments, local computing device 115, 120 may be a personal computer or smart phone. Where local computing device 115, 120 is a smart phone, the smart phone may have a dedicated application directed to collecting data (e.g., voice control data) and determining an instruction therefrom. The local computing device 115, 120 may process the data received from the one or more sensor units 110 to obtain instructions for operating control panel 135 or other component of communications system 100. In alternate embodiments, remote computing device 140 may process the data received from the one or more sensor units 110, via network 125 and server 130, to obtain instructions, commands, or the like. Data transmission may occur via, for example, frequencies appropriate for a personal area network (such as BLUETOOTH® or IR communications) or local or wide area network frequencies such as radio frequencies specified by the IEEE 802.15.4 standard. In other embodiments, data transmission may occur over existing electrical wiring of the building or property being monitored by the security and/or automation system.

One or more of the sensor units 110 may be integrated into the computing devices 115, 120 or other electronic device of a building (e.g., power outlets and/or wall-mounted switches). The sensor units 110 may be mounted within an existing housing of the building such as an electrical box where an electronic device is typically stored.

In some embodiments, local computing device 115, 120 may communicate with remote computing device 140 or control panel 135 via network 125 and server 130. Examples of networks 125 include cloud networks, local area networks (LAN), wide area networks (WAN), virtual private networks (VPN), wireless networks (using 802.11, for example), and/or cellular networks (using 3G and/or LTE, for example), etc. In some configurations, the network 125 may include the Internet. In some embodiments, a user may access the functions of local computing device 115, 120 from remote computing device 140. For example, in some embodiments, remote computing device 140 may include a mobile application that interfaces with one or more functions of local computing device 115, 120.

The server 130 may be configured to communicate with the sensor units 110, the local computing devices 115, 120, the remote computing device 140 and control panel 135. The server 130 may perform additional processing on signals received from the sensor units 110 or local computing devices 115, 120, or may simply forward the received information to the remote computing device 140 and control panel 135.

Server 130 may be a computing device operable to receive data streams (e.g., from sensor units 110 and/or local computing device 115, 120 or remote computing device 140), store and/or process data, and/or transmit data and/or data summaries (e.g., to remote computing device 140). For example, server 130 may receive a stream of voice command data from a sensor unit 110, a stream of occupancy related data from the same or a different sensor unit 110, and a stream of video or audio data from either the same or yet another sensor unit 110. In some embodiments, server 130 may "pull" the data streams, e.g., by querying the sensor units 110, the local computing devices 115, 120, and/or the control panel 135. In some embodiments, the data streams may be "pushed" from the sensor units 110 and/or the local computing devices 115, 120 to the server 130. For example, the sensor units 110 and/or the local computing device 115, 120 may be configured to transmit data as it is generated by or entered into that device. In some instances, the sensor units 110 and/or the local computing devices 115, 120 may periodically transmit data (e.g., as a block of data or as one or more data points).

The server 130 may include a database (e.g., in memory) containing voice command data received from the sensor units 110 and/or the local computing devices 115, 120. Additionally, as described in further detail herein, software (e.g., stored in memory) may be executed on a processor of the server 130. Such software (executed on the processor) may be operable to cause the server 130 to monitor, process, summarize, present, and/or send a signal associated with resource usage data.

Figure 2:
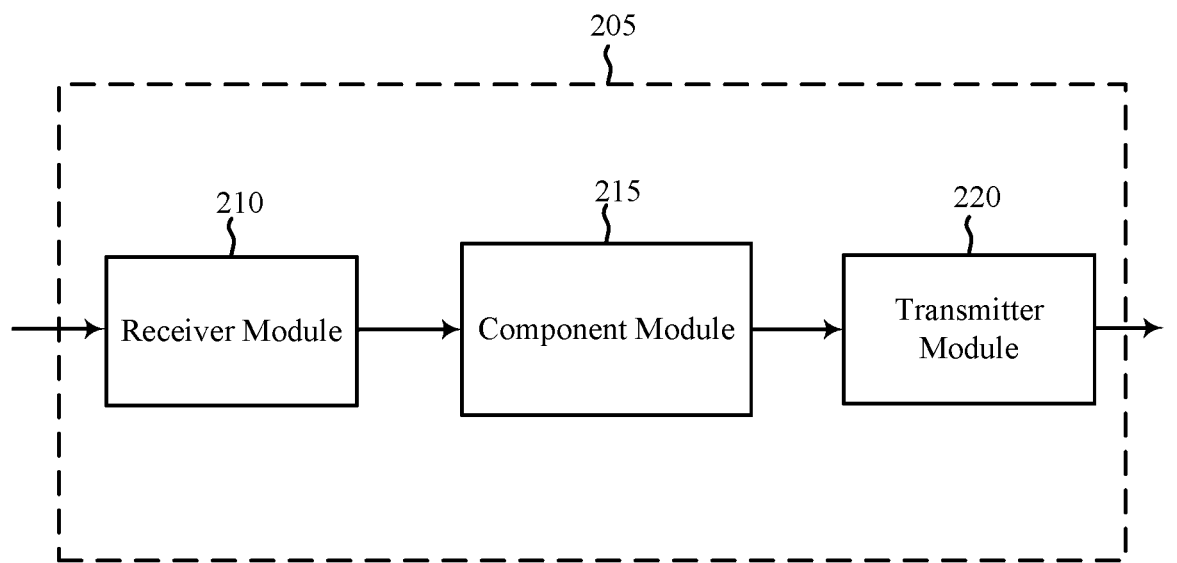
FIG. 2 shows a block diagram of a device relating to a security and/or an automation system, in accordance with various aspects of this disclosure.

FIG. 2 shows a block diagram 200 of a component 205 for use in electronic communication, in accordance with various aspects of this disclosure. The component 205 may be an example of one or more aspects of a control panel 135 described with reference to FIG. 1. The component 205 may include a receiver module 210, a component module 215, and/or a transmitter module 220. The component 205 may also be or include a processor. Each of these modules may be in communication with each other—directly and/or indirectly.

The components of the component 205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The component 205 may be hardwired to electrical wiring of the building. For example, component 205 may replace an existing electronic device that is hardwired to the electrical of a building (e.g., an electrical outlet, a light switch, or the like). The electrical wiring may provide multiple functions in conjunction with component 205. For example, electrical wiring may provide a source of electrical power for operating component 205. The electrical wiring may also provide a communication medium for communicating data between the component and other components that are also connected to the electrical wiring of the building. The other components may be additional components of a security and/or automation system. The other components may include, for example, a control panel, a computing device, or another component that has the same or similar features and functionality of component 205.

The component 205 may be retrofit to an existing electronic device that is connected to the electrical wiring of the building. In at least some examples, the component 205 is mounted within the same electrical box as the electronic device. The electrical box may be permanently mounted within a wall structure of the building. The electrical wiring may be fed to the electrical box and then connected to the component and/or electronic device that is positioned in the electrical box. In other examples, the component is mounted to the electronic device such as, for example, plugged into an electrical outlet device and positioned outside of the electrical box.

Additionally, or alternatively, the component 205 may be integrated into a common housing with the electronic device. The integrated component and electronic device may be mounted within a common electrical box such as an electrical box that is permanently mounted within a wall structure of a building. The integrated component and electronic device may include some features unique to the component and some features unique to the electronic device. In one example, the integrated component and electronic device include at least one electrical plug feature (e.g., a female plug structure) and one or more components such as, for example, a sensor, a microphone, a speaker, a camera, or the like.

The integrated component and electronic device may be generally referred to as an integrated device throughout the present disclosure. The integrated device may be a stand-alone, integrally packaged device that may be mounted within and/or mounted to an electrical box. The integrated device may be connected to electrical wiring of the building to provide a constant source of electrical power for operating the integrated device. In at least some embodiments, the integrated device may have an appearance that generally matches the electronic device that would typically be mounted in that particular electrical box.

The use of existing electrical wiring to power the component, whether the component is provided separately, retrofit to an existing electronic device, or provided as an integrated device, may avoid the problem of providing an electrical power source for operating the component. In at least some scenarios, separate electrical wiring must be run through the building to the location where the component is located in the building. Other types of components are battery-operated, which requires additional maintenance and downtime for the component depending on the power level of the battery.

Providing the component and the electronic device in the same electrical box may also facilitate easier control of the electronic device by the component. In one example, data, commands, or instructions provided at the component or via the component may be used to control at least some functionality of the electronic device. In one example, the component is a voice-activated component that receives voice commands from a user related to operation of the integrated electronic device, wherein the electronic device is, for example, an electrical switch or electrical outlet.

The receiver module 210 may receive information such as packets, user data, and/or control information associated with various information channels (e.g., control channels, data channels, etc.). The receiver module 210 may be configured to receive inputs such as, for example, inputs from one or more of the sensor units 110 described with reference to FIG. 1, voice command, communications and/or commands from control panel 135 and/or computing devices 115, 120, 140, and the like. Information may be passed on to the component module 215, and to other aspects of the component 205.

The component module 215 may operate to provide various functions associated with component 205. In an example in which the component 205 is a voice control component, component module 215 may receive voice commands via, for example, a microphone that is part of component 205. Component module 215 may include capability to process the received voice command and generate instructions that are sent via transmitter module 220 to another component, computing device or the like to carry out the voice command. In one example, transmitter module 220 is connected to an electronic device that is located proximate to component 205 and is operated in response to the instructions generated by component module 215.

In another example, the instructions transmitted by transmitter module 220 may be received by a speaker that is part of component 205 and/or located proximate or remote from component 205. The speaker may output an audible message. In other examples, the audible signals received at receiver module 210 may be forwarded via component module 215 and transmitter module 220 to a remote computing device such as a control panel of a security and/or automation system. The control panel may process the incoming voice command and determine an action to take in response to the voice command. The action may be instructions received at receiver module 210, which are determined by component module 215 to be, for example, an audible message conveyed via a speaker of component 205 or another device in proximity to component 205.

In other embodiments, component 205 may have different features and functions such as, for example, sensor features, camera features, and the like. The component 205 may be any component of a security and/or automation system. The component module 215 may provide processing functions, data storage functions, user interface functions, input/output control functions, and the like.

The transmitter module 220 may transmit the one or more signals received from other features of the component 205. The transmitter module 220 may transmit voice commands (e.g., voice command data), sensor signals, audio and/or video data, and other instructions, commands, data and the like. In some examples, the transmitter module 220 may be collocated with the receiver module 210 in a transceiver module.

Figure 3:
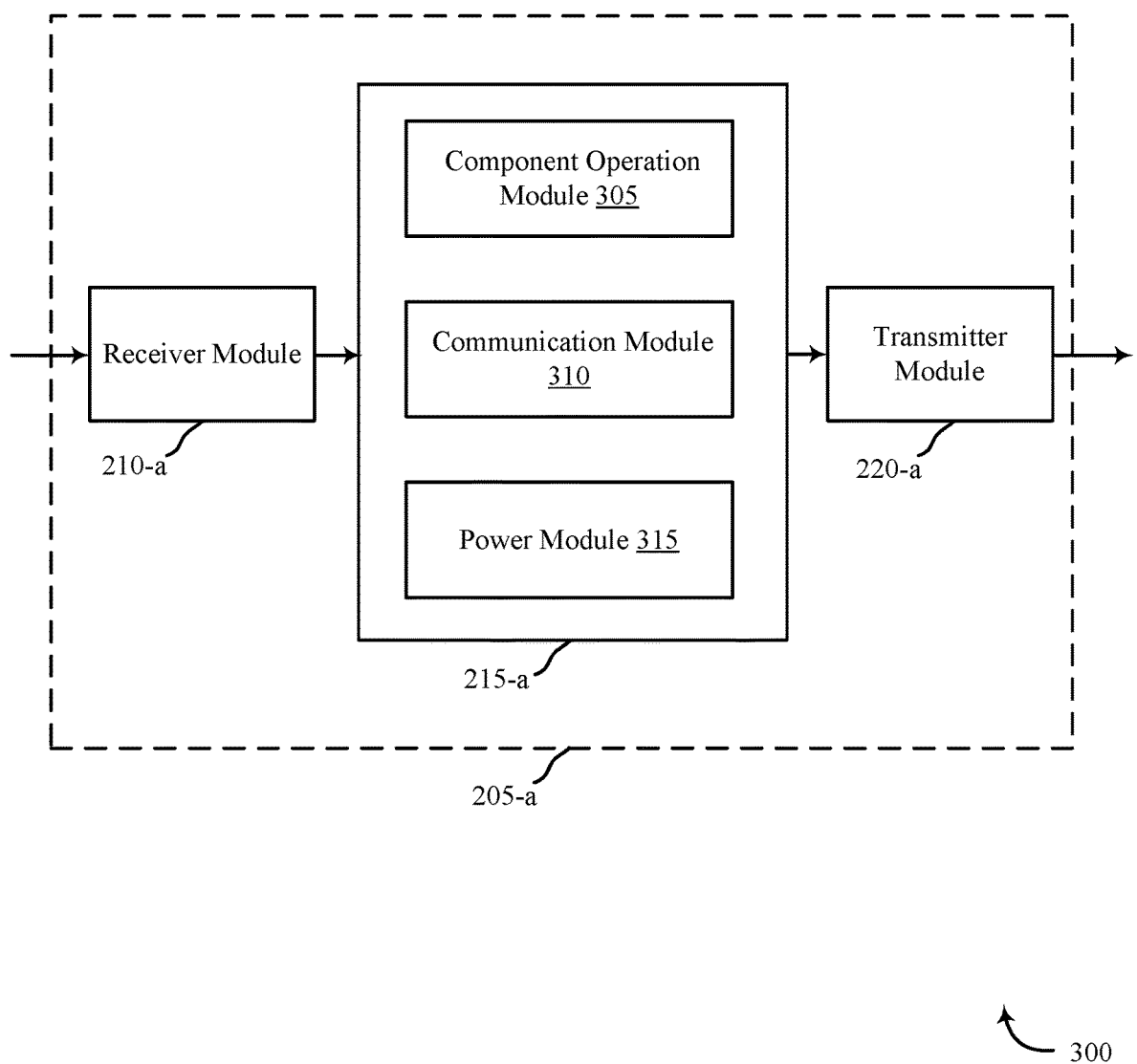
FIG. 3 shows a block diagram of a device relating to a security and/or an automation system, in accordance with various aspects of this disclosure.

FIG. 3 shows a block diagram 300 of a component 205-$a$ for use in wireless communication, in accordance with various examples. The component 205-$a$ may be an example of one or more aspects of a control panel 105 described with reference to FIG. 1. It may also be an example of a component 205 described with reference to FIG. 2. The component 205-$a$ may include a receiver module 210-$a$, a component module 215-$a$, and/or a transmitter module 220-$a$, which may be examples of the corresponding modules of component 205. The component 205-$a$ may also include a processor. Each of these components may be in communication with each other. The component module 215-$a$ may include a component operation module 305, a communication module 310, and a power module 315. The receiver module 210-$a$ and the transmitter module 220-$a$ may perform the functions of the receiver module 210 and the transmitter module 220, of FIG. 2, respectively.

The components of the apparatus 205-$a$ may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors The component operation module 305 may operate to monitor operation of the component 205-$a$. Component operation module 305 may operate to determine one or more actions to take in response to operation of component 205-$a$ and/or data received by component 205-$a$. Component operation module 305 may provide processing, data storage, generation of messages and/or commands, and the like. In embodiments in which component 205-$a$ includes a microphone, a user interface, or other feature that provides user input of one or more instructions either audibly or otherwise, component operation module 305 identifies the user input and determines one or more operations in response to the user input. In at least some examples, the user input identified by component operation module 305 indicates the user input should be passed through component 205-$a$ to another device such as a control panel of a security and/or automation system. In other embodiments, the user input prompts a response generated by component operation module 305 such as displayed or audible instructions and/or feedback.

In embodiments in which component 205-$a$ comprises voice control capability, a user may speak a trigger word that component operation module 305 identifies as a trigger to activate the voice control system and/or functionality. The trigger words may include a phrase such as "automation system" or "voice control" or a similar phrase. The user may elect to "name" the automation system. The automation system may then respond when the name is spoken.

In other embodiments, component operation module 305 may identify a particular user's voice, and identification of the user's voice triggers operation of the voice control system. Once the voice control functionality is activated, spoken words or phrases may be identified by component operation module 305, and component operation module 305 may perform certain functions in response, or at least prompt initiation of certain responses.

In some examples, when the trigger words are identified, component operation module 305 may generate a responsive audible communication such as, for example, "voice control activated," "hello [name], how may I help you?", or the like. The user may then provide a command that component operation module 305 may identify and act upon. In some instances, component operation module 305 may provide a completion response after the requested action is completed such as "action completed." The response may be more personable such as, for example, "thank you [name], the [command] has been completed. Is there anything else I can help you with?"

In other examples, certain functions may be possible or made available for particular users. As such, when component operation module 305 identifies the voice of a particular user, a specific list of possible commands may be made available. In at least some examples, component operation module 305 may provide a response to the user that includes a list of the potential commands. The commands may be unique to the particular component 205-a, or an electronic device that works in conjunction with component 205-a (e.g., an integrated device as discussed above). In other examples, the commands are associated with other aspects of a security and/or automation system, such as controlling features or functionality of a control panel, or systems or devices that are operated by a control panel or other computing devices of the security and/or automation system.

As discussed above, component 205-a may include one or a plurality of different types of components and/or functionality, including voice control. Other options include a camera, speaker, sensor (e.g., motion, glass break, temperature, or lighting), and the like. Component operation module 305 may stream the data from the one or more devices, sensors or the like associated with component 205-a onto another device such as a control panel of a security and/or automation system. Alternatively, component operation module 305 may process data, information, instructions, commands, and the like received from the device and/or sensor and provide a responsive message, feedback or command.

Communication module 310 may facilitate communications between component 205-a and other devices or subcomponents of component 205-a. Communication module 310 may facilitate receiving and/or transmitting of data via receiver module 210-a and transmitter module 220-a. Communication module 310 may communicate information audibly, visually, digitally, or in any other format.

The communication module 310 may communicate via wired or wireless communication mediums. In at least one example, communication module 310 may provide communication via the electrical wiring to which component 205-a is connected to as a source of power. Communication module 310 may provide for wireless communication via a wireless network. The wireless communications may include sending or receiving data from other components or devices of a security and/or automation system.

Power module 315 may operate to provide power to component 205-a and/or other components, devices or the like that are proximate to or electronically coupled to component 205-a. In an example in which component 205-a is an integrated device, power module 315 may control power provided to the electronic device features (e.g., a power outlet and/or electronic switch). In some examples, power module 315 controls power provided to component 205-a.

Figure 4:
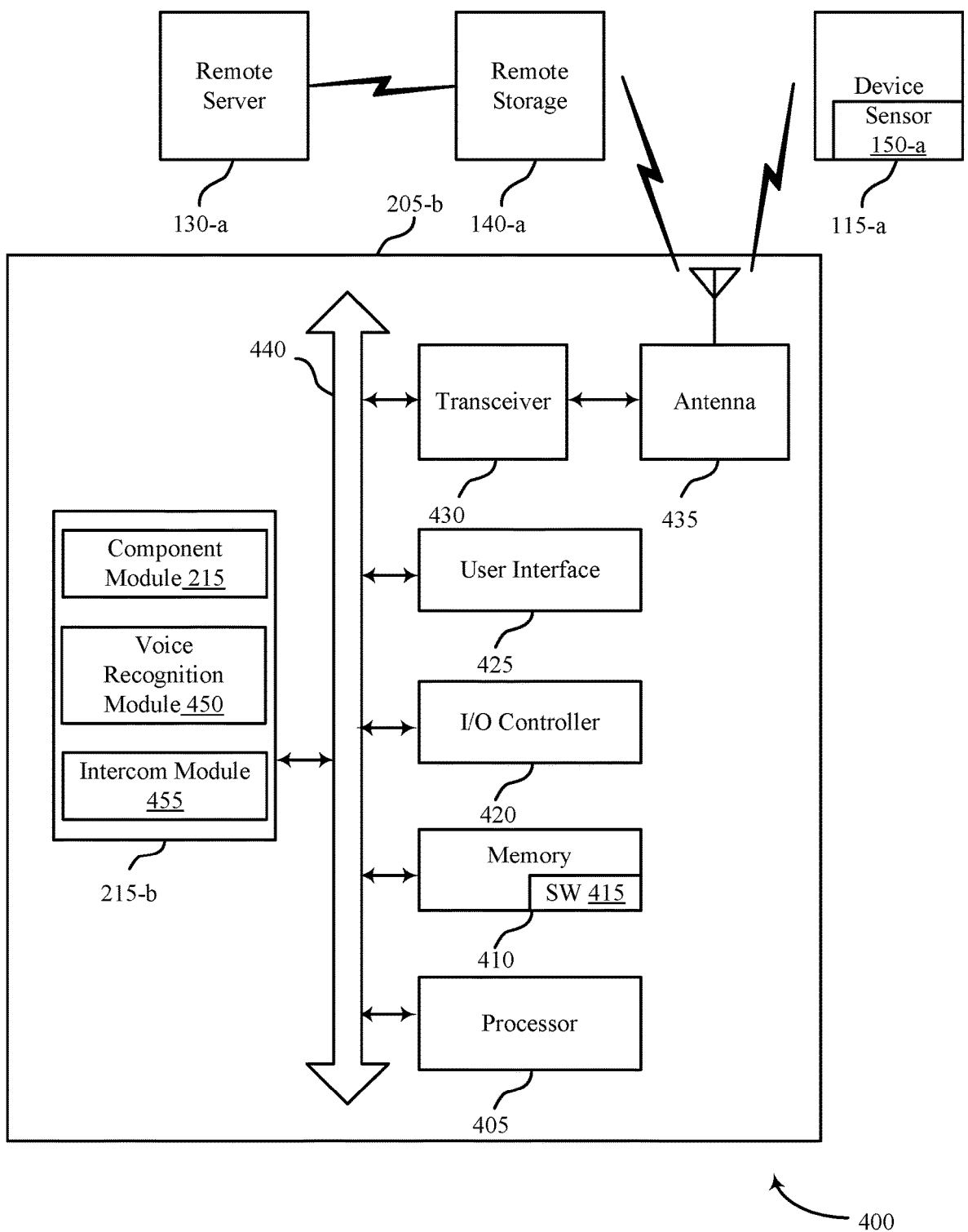
FIG. 4 shows a block diagram relating to a security and/or an automation system, in accordance with various aspects of this disclosure.

FIG. 4 shows a system 400 for use in voice control, intercom, camera, motion control, and other types of systems, in accordance with various examples. System 400 may include a component 205-b, which may be an example of the component 205 and/or 205-a of FIGS. 2 and 3.

Component 205-b may include component module 215, which may be an example of component module 215 and/or 215-a described with reference to FIGS. 2 and 3. Component 205-b may also include voice recognition module 450 and intercom module 455. In some embodiments, the terms a control panel and a control device are used synonymously.

Component 205-b may also include components for bi-directional voice and data communications including components for transmitting communications and components for receiving communications. For example, component 205-b may communicate bi-directionally with one or more of computing device 115-a, one or more sensors 150-a, remote storage 140-a, which may be an example of the remote computing device 140 described with reference to FIG. 1, and/or remote server 130-a, which may be an example of the remote server 130 of FIG. 1. This bi-directional communication may be direct (e.g., component 205-b communicating directly with remote storage 140-a) or indirect (e.g., component 205-b communicating indirectly with remote server 130-a through remote storage 140-a).

A voice recognition module 450 may operate to distinguish between various user voices that are spoken. Voice recognition module 450 may operate at least in part on component 205-b, and at least in part on another computing device such as, for example, a control panel (e.g., control panel 135 described with reference to FIG. 1) or computing device 115-a. Voice recognition module 450 may be able to distinguish between genders, age groups (e.g., adult versus child), or particular users. For example, component module 215-b may include the ability to reference stored voice profiles. Certain functions (e.g., administrative rights) may be adjusted only by certain users, and the user is identified based on the stored voice profile.

Voice recognition module 450 may also be programmed to distinguish between words spoken by users that are not intended to be voice commands versus intended voice commands. Voice recognition module 450 may be triggered into a command mode based on certain words that are spoken by the user. Voice recognition module 450 may provide an audible response to the user to confirm that the spoken trigger word was intended as a way to initiate voice control. Any of the voice commands that are spoken may be repeated by the system as a way to confirm the particular voice command. Voice recognition module 450 may, alternatively, provide responses to the users via a display or other means (e.g., a message sent to a mobile hand-held computing device carried by the user) as opposed to providing an audible response.

Voice recognition module 450 may operate to receive instructions for operation of a particular electronic device in the same general vicinity as component 205-b, or may receive voice commands for remotely positioned devices. In an embodiment in which component 205-b is integrated with an electronic device such as a power outlet or light switch, the voice command may relate specifically to providing power to and/or operation of the electronic device. In other examples, the voice commands may relate to controlling settings or other operations of the control panel or other computing devices associated with a security and/or automation system.

Intercom module 455 may operate to facilitate audible communications between a plurality of component 205-*b*. Typically, component 205-*b* may be located in various rooms, living spaces or other areas of a monitored property. Intercom module 455 may facilitate delivery of audible messages between a plurality of component 205-*b* to act as an intercom system. Each component 205-*b* may include a microphone and speaker. The microphone may collect audible messages at one location which are transferred via intercom module 455 to a different component 205-*b*, wherein the speaker of that different component projects the audible message. Intercom module 455 may route the audible messages through a control panel of a security and/or automation system, or other computing device thereof. Intercom module 455 may transmit the audible signals wirelessly or through a wired connection. The wired connection may be the electrical wiring of a building that provides power for components 205-*b*. In at least some examples, the different component 205-*b* includes a control panel (e.g., control panel 135 described with reference of FIG. 1).

Intercom module 455 may facilitate delivery of audible messages between various components 205-*b* of a security and/or automation system concurrently with delivery of other data such as, for example, a video stream, sensor data, or commands provided via voice commands and/or a user interface (e.g., a keypad or a touch display screen).

Component 205-*b* may also include a processor module 405, and memory 410 (including software/firmware code (SW) 415), an input/output controller module 420, a user interface module 425, a transceiver module 430, and one or more antennas 435, each of which may communicate—directly or indirectly—with one another (e.g., via one or more buses 440). The transceiver module 430 may communicate bi-directionally, via the one or more antennas 435, wired links, and/or wireless links, with one or more networks or remote devices as described above. For example, the transceiver module 430 may communicate bi-directionally with one or more of computing device 115-*a*, remote storage 140-*a*, and/or remote server 130-*a*.

The transceiver module 430 may include a modem to modulate the packets and provide the modulated packets to the one or more antennas 435 for transmission, and to demodulate packets received from the one or more antenna 435. While a control panel or a control device (e.g., 205-*b*) may include a single antenna 435, the control panel or the control device may also have multiple antennas 435 capable of concurrently transmitting or receiving multiple wired and/or wireless transmissions. In some embodiments, one element of component 205-*b* (e.g., one or more antennas 435, transceiver module 430, etc.) may provide a direct connection to a remote server 130-*a* via a direct network link to the Internet via a POP (point of presence). In some embodiments, one element of component 205-*b* (e.g., one or more antennas 435, transceiver module 430, etc.) may provide a connection using wireless techniques, including digital cellular telephone connection, Cellular Digital Packet Data (CDPD) connection, digital satellite data connection, and/or another connection.

The signals associated with system 400 may include wireless communication signals such as radio frequency, electromagnetics, local area network (LAN), wide area network (WAN), virtual private network (VPN), wireless network (using 802.11, for example), 345 MHz, Z-WAVE®, cellular network (using 3G and/or LTE, for example), and/or other signals. The one or more antennas 435 and/or transceiver module 430 may include or be related to, but are not limited to, WWAN (GSM, CDMA, and WCDMA), WLAN (including BLUETOOTH® and Wi-Fi), WMAN (WiMAX), antennas for mobile communications, antennas for Wireless Personal Area Network (WPAN) applications (including RFID and UWB). In some embodiments, each antenna 435 may receive signals or information specific and/or exclusive to itself. In other embodiments, each antenna 435 may receive signals or information not specific or exclusive to itself.

In some embodiments, one or more sensors 150-*a* (e.g., motion, proximity, smoke, light, glass break, door, window, carbon monoxide, and/or another sensor) may connect to some element of system 400 via a network using one or more wired and/or wireless connections.

In some embodiments, the user interface module 425 may include an audio device, such as an external speaker system, an external display device such as a display screen, and/or an input device (e.g., remote control device interfaced with the user interface module 425 directly and/or through I/O controller module 420).

One or more buses 440 may allow data communication between one or more elements of component 205-*b* (e.g., processor module 405, memory 410, I/O controller module 420, user interface module 425, etc.).

The memory 410 may include random access memory (RAM), read only memory (ROM), flash RAM, and/or other types. The memory 410 may store computer-readable, computer-executable software/firmware code 415 including instructions that, when executed, cause the processor module 405 to perform various functions described in this disclosure (e.g., identify one or more voice commands, modify a setting of the control panel or other computing device 115-*a* in response to the voice command, provide an intercom communication, communicate data received via one or more sensors through existing electrical wiring of a building, etc.).

Alternatively, the software/firmware code 415 may not be directly executable by the processor module 405 but may cause a computer (e.g., when compiled and executed) to perform functions described herein. Alternatively, the computer-readable, computer-executable software/firmware code 415 may not be directly executable by the processor module 405 but may be configured to cause a computer (e.g., when compiled and executed) to perform functions described herein. The processor module 405 may include an intelligent hardware device, e.g., a central processing unit (CPU), a microcontroller, an application-specific integrated circuit (ASIC), etc.

In some embodiments, the processor module 405 may include, among other things, an intelligent hardware device (e.g., a central processing unit (CPU), a microcontroller, and/or an ASIC, etc.). The memory 410 can contain, among other things, the Basic Input-Output system (BIOS) which may control basic hardware and/or software operation such as the interaction with peripheral components or devices. For example, the component module 215, the voice recognition module 450, and/or intercom module 455 to implement the present systems and methods may be stored within the system memory 410. Applications resident with system 400 are generally stored on and accessed via a non-transitory computer readable medium, such as a hard disk drive or other storage medium. Additionally, applications can be in the form of electronic signals modulated in accordance with the application and data communication technology when accessed via a network interface (e.g., transceiver module 430, one or more antennas 435, etc.).

Many other devices and/or subsystems may be connected to one or may be included as one or more elements of system 400 (e.g., entertainment system, computing device, remote cameras, wireless key fob, wall mounted user interface device, cell radio module, battery, alarm siren, door lock, lighting system, thermostat, home appliance monitor, utility equipment monitor, and so on).

In some embodiments, all of the elements shown in FIG. 4 need not be present to practice the present systems and methods. The devices and subsystems can be interconnected in different ways from that shown in FIG. 4. In some embodiments, an aspect of some operation of a system, such as that shown in FIG. 4, may be readily known in the art and are not discussed in detail in this application. Code to implement the present disclosure can be stored in a non-transitory computer-readable medium such as one or more of system memory 410 or other memory. The operating system provided on I/O controller module 420 may be iOS®, ANDROID®, MS-DOS®, MS-WINDOWS®, OS/2®, UNIX®, LINUX®, or another known operating system.

The transceiver module 430 may include a modem configured to modulate the packets and provide the modulated packets to the antennas 435 for transmission and/or to demodulate packets received from the antennas 435. While the computing devices 115-a may include a single antenna 435, the computing devices 115-a may have multiple antennas 435 capable of concurrently transmitting and/or receiving multiple wireless transmissions.

Figure 5:
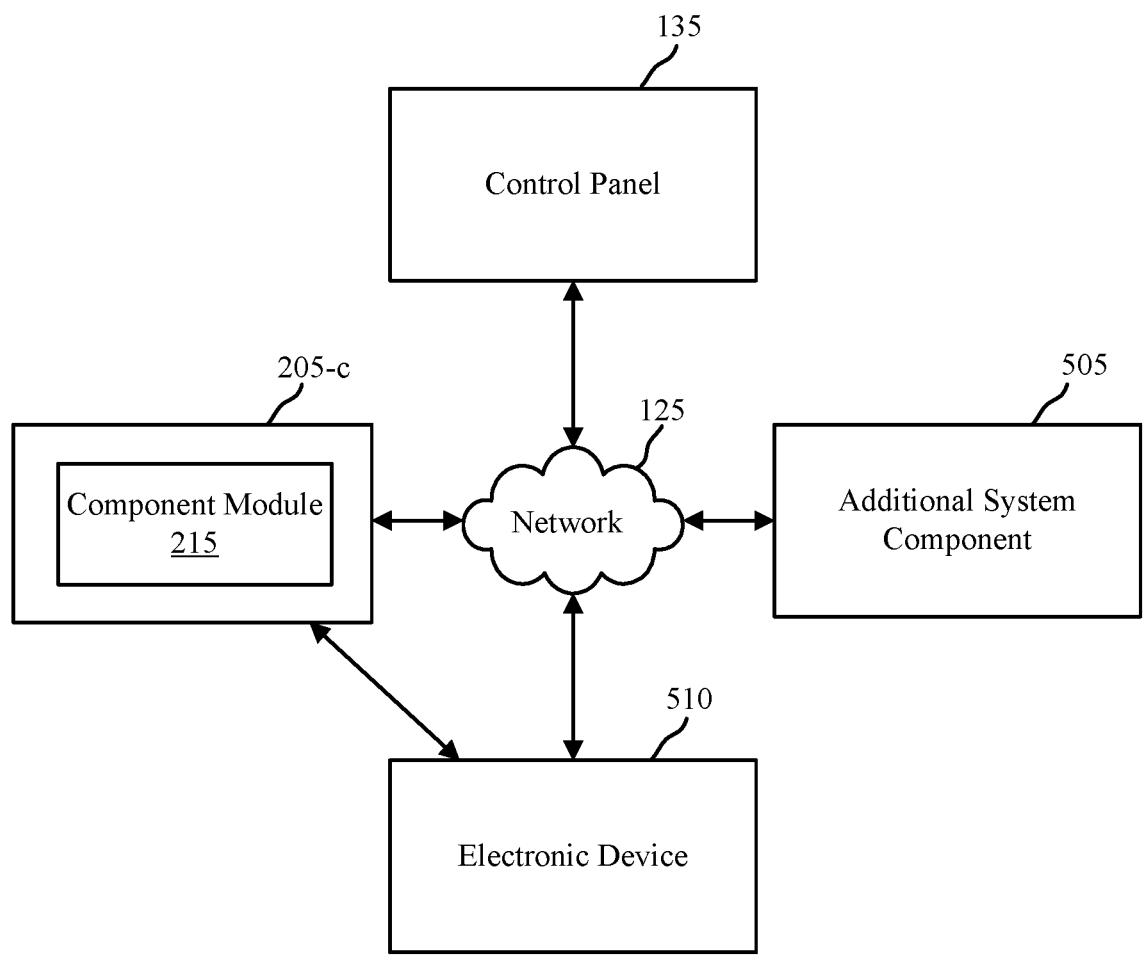
FIG. 5 shows a block diagram relating to a security and/or an automation system, in accordance with various aspects of this disclosure.

FIG. 5 is a block diagram illustrating an example system 500 for implementing various aspects of the present disclosure. The system 500 includes a control panel 135, a component 205-c having a component module 215, an additional system component 505, and an electronic device 510. All of the components of system 500 may be in communication via network 125. The component 205-c may also be in direct communication with electronic device 510. In at least some examples, component 205-c and electronic device 510 may be integrated into a single housing and be considered an integrated device. The integrated device may be mounted in an electrical box in a wall of a building. The integrated device may be connected to electrical wiring of the building. In at least some examples, network 125 may include the electrical wiring of the building. In other examples, network 125 may include a wireless communication medium such as Wi-Fi, a cellular network, or the like, as described above with reference to FIG. 1.

Component 205-c may be the same or similar as additional system component 505. The components 205-c and 505 may be located in different areas (e.g., rooms) of a property or building. Control panel 135 may be positioned in yet a different area or room of the property.

In some embodiments, as described above, component 205-c and additional system component 505 may provide an intercom system for communication of audible messages throughout a property. In some examples, the audible messages are routed through the control panel 135 as part of being communicated between components 205-c and 505. The control panel 135 may route the audible message to all or any combination of components 205-c and 505. In other examples, the audible communications bypass control panel 135.

In other embodiments, component module 215 operates to control one or more features or functionality of electronic device 510. Component module 215 may receive voice commands or other data that relates to control of electronic device 510. Alternatively, the commands or data received at component module 215 may be used to control features or functionality of control panel 135.

Component 205-c may include a microphone and/or speaker to facilitate the voice commands. In other embodiments, component 205-c may include a user interface such as a keypad, a display, touch screen, or the like to facilitate communications with a user (e.g., receiving commands from a user related to operation of electronic device 510 and/or control panel 135).

Figure 6:
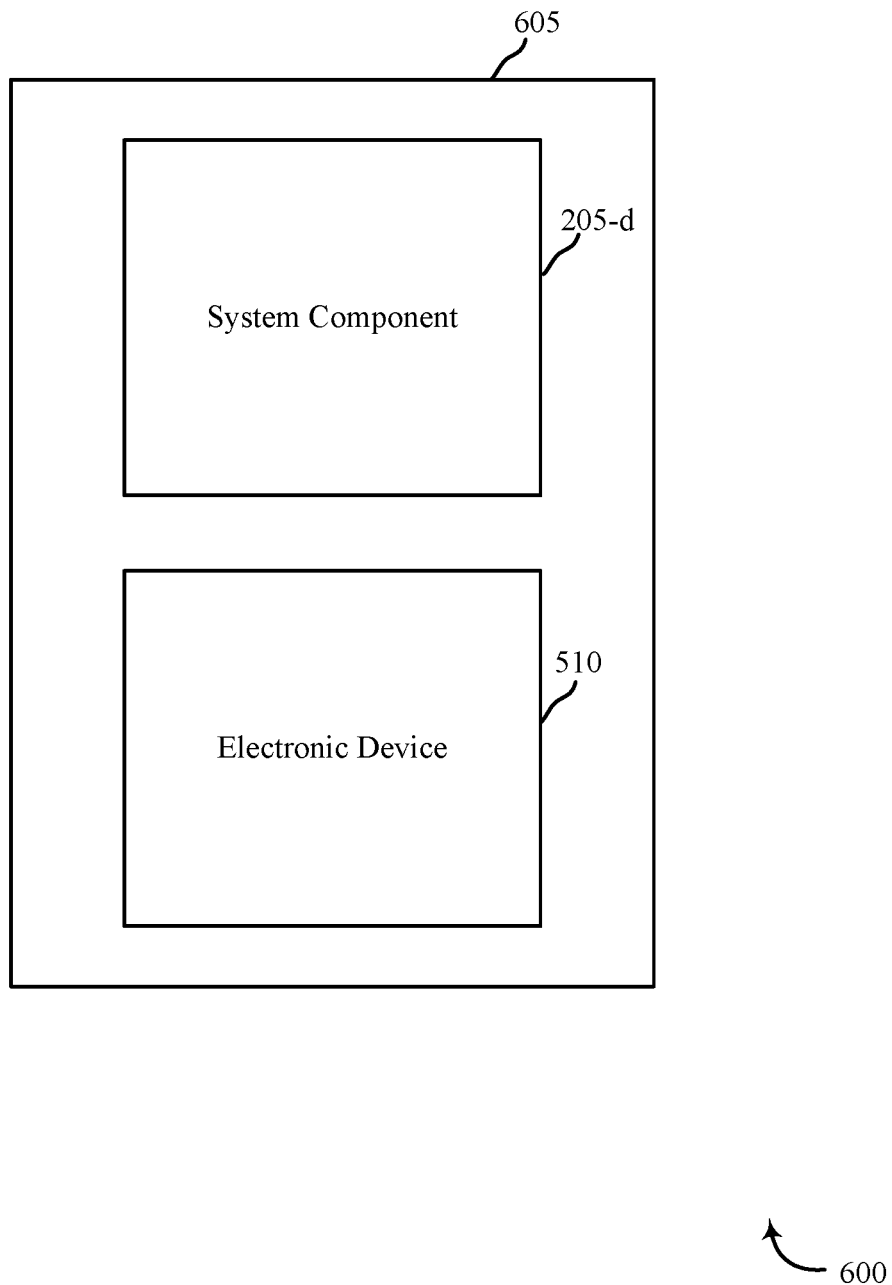
FIG. 6 shows a block diagram relating to an integrated device, in accordance with various aspects of this disclosure.

FIG. 6 is a schematic diagram of an integrated device 600. Integrated device 600 includes a housing 605, a system component 205-d, and an electronic device 510. The integrated device 600 may be configured for installation in an existing electrical box in a wall of a building. Electrical wiring may be routed to the electrical box and connected in electrical communication with integrated device 600. At least some operations of system component 205-d may include controlling features or functionality of electronic device 510. In at least some examples, electronic device 510 includes a power outlet, a lighting switch, a fan switch, or other electronic device that is intended to be wall-mounted such as mounted in an electrical box in a wall of the building.

System component 205-d may be one example of the components 205 described above with reference to FIGS. 2-5. System component 205-d may include voice control capability including, for example, a microphone, a speaker, a processor, and one or more modules to facilitate operation of system component 205-d.

Housing 605 may be sized and shaped to include other components such as, for example, the microphone, speaker, processor, and the like associated with system component 205-d.

Figure 7:
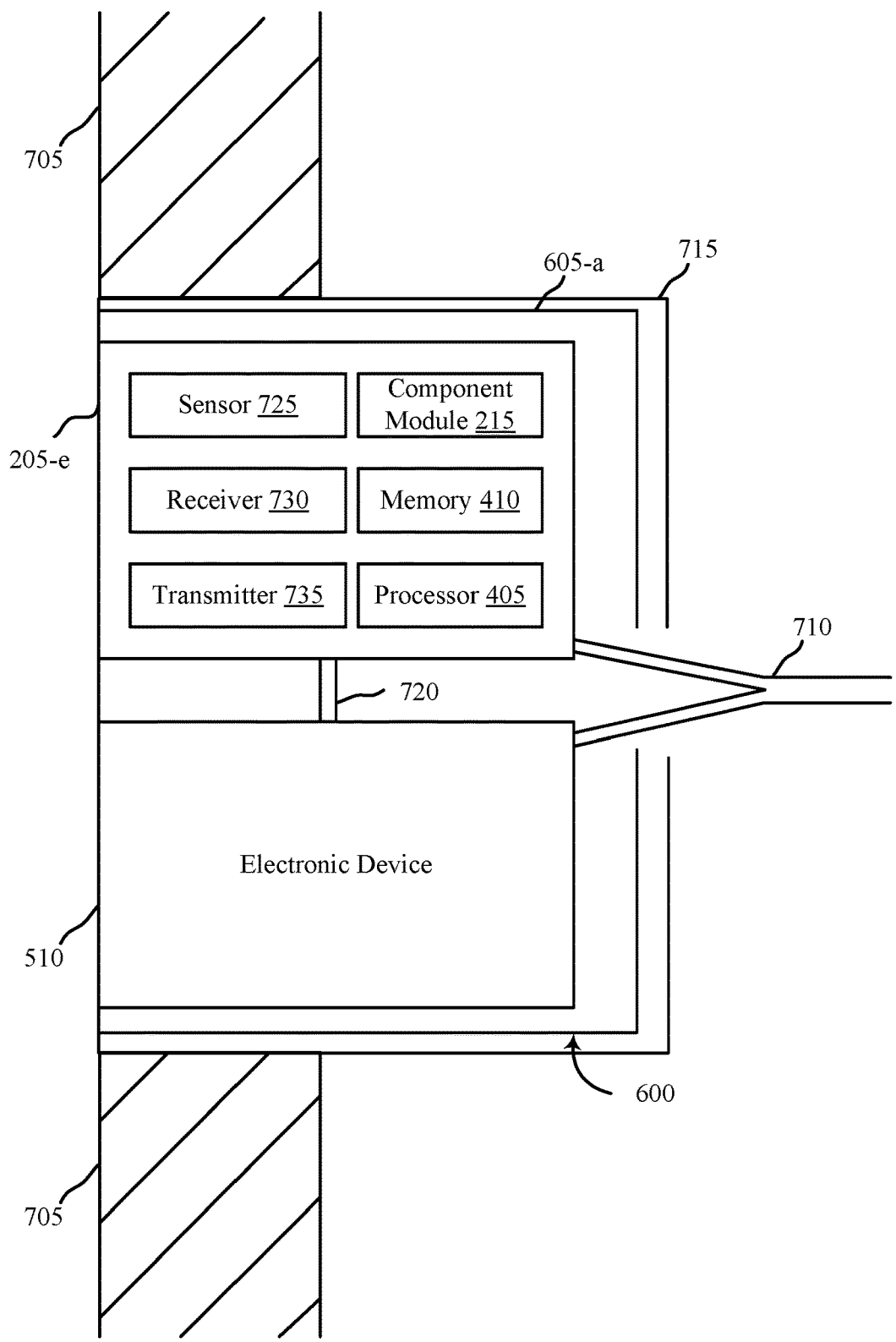
FIG. 7 shows a block diagram relating to an integrated device, in accordance with various aspects of this disclosure.

FIG. 7 is a schematic diagram of integrated device 600 mounted in a wall 705 of a building. The integrated device 600 may be connected to electrical wiring 710 and may be positioned within an electrical box 715.

Integrated device 600 may provide a direct connection 720 between the system component 205-e and electronic device 510. In other examples, the system component 205-e and electronic device 510 may be in communication with each other via electrical wiring 710 rather than a separate connection 720.

System component 205-e may include, in addition to component module 215, a processor module 405 and memory 410, a sensor 725, a receiver 730, and a transmitter 735. Sensor 725 may be one example of sensor units 110 described above with reference to at least FIG. 1. Receiver 730 may facilitate operation of the receiver module 210, and transmitter 735 may facilitate operation of the transmitter module 220 described with reference to FIGS. 2 and 3. System component 205-e may include other features, components, and the like. At least some of the components of system component 205-e shown in FIG. 7 may be included in electronic device 510. Electronic device 510 may include, for example, a power outlet, a switch, a button, or other components of a security and/or automation system.

In some embodiments, integrated device 600 includes a user interface that provides communication between a user and one or more of system component 205-*e* and electronic device 510. In examples in which voice control is relied upon, integrated device 600 may include at least one of a microphone and a speaker to facilitate audible communications between a user and integrated device 600.

Figure 8:
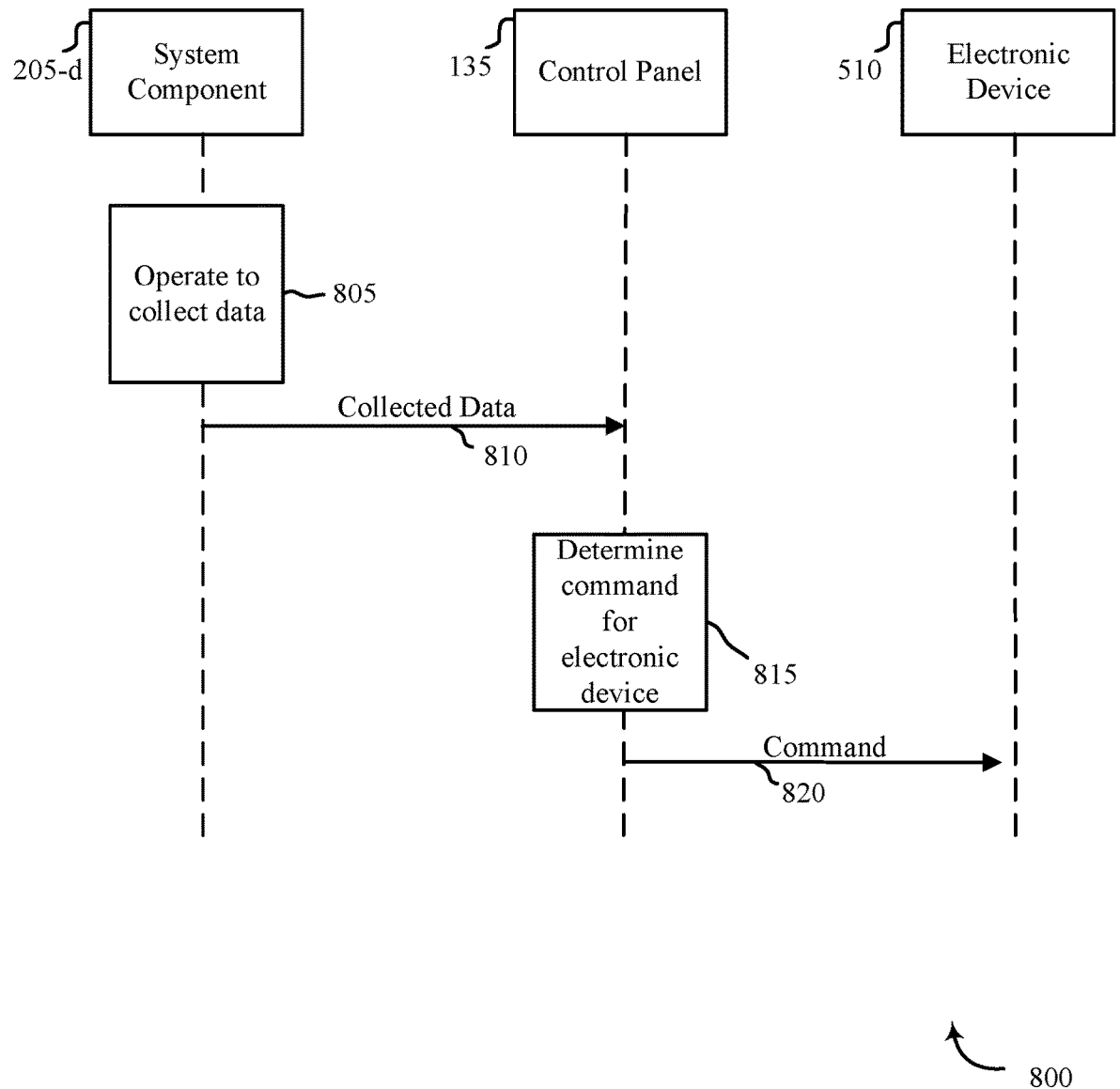
FIG. 8 shows a block diagram of an apparatus relating to a security and/or an automation system, in accordance with various aspects of this disclosure.

FIG. 8 is a block diagram of an apparatus relating to a security and/or an automation system, in accordance with various aspects of this disclosure. The apparatus 800 includes a system component 205-*d*, which may be one example of the system components 205 described with reference to FIGS. 2-7, a control panel 135, which may be one example of the electronic device 510 described with reference to FIGS. 1 and 5, and an electronic device 510, which may be one example of the electronic device 510 described with reference to FIGS. 5-7.

In at least some examples, the electronic device 510 and system component 205-*d* are positioned in a common housing and/or positioned within a common electrical box in a wall of a building. Some embodiments include system component 205-*d* and electronic device 510 integrated into a single device referred to as an integrated device. Control panel 135 may be located remote from system component 205-*d* and electronic device 510. Control panel 135 may be a control panel of a security and/or automation system. Control panel 135 may provide a user interface, a processor, data storage, and controls for operating one or more features or functions of the security and/or automation system (e.g., receiving feedback from sensors, determining an alarm condition, arming a security feature, determining occupancy of a property, locking or unlocking doors, windows and other barriers, and the like).

According to apparatus 800, system component 205-*d* may operate to collect data at block 805. The collected data 810 may be transmitted to control panel 135. Control panel 135 may determine a command for the electronic device at block 815. The command 820 is transferred to electronic device 510. Electronic device 510 may be any feature or component of a security and/or automation system, or a feature or component that is controlled by the security and/or automation system.

The collected data 810 may include, for example, a voice command, data received from one or more sensors, a video feed, or the like. Control panel 135 may process the collected data 810 as part of determining what command is intended for the electronic device 510.

Figure 9:
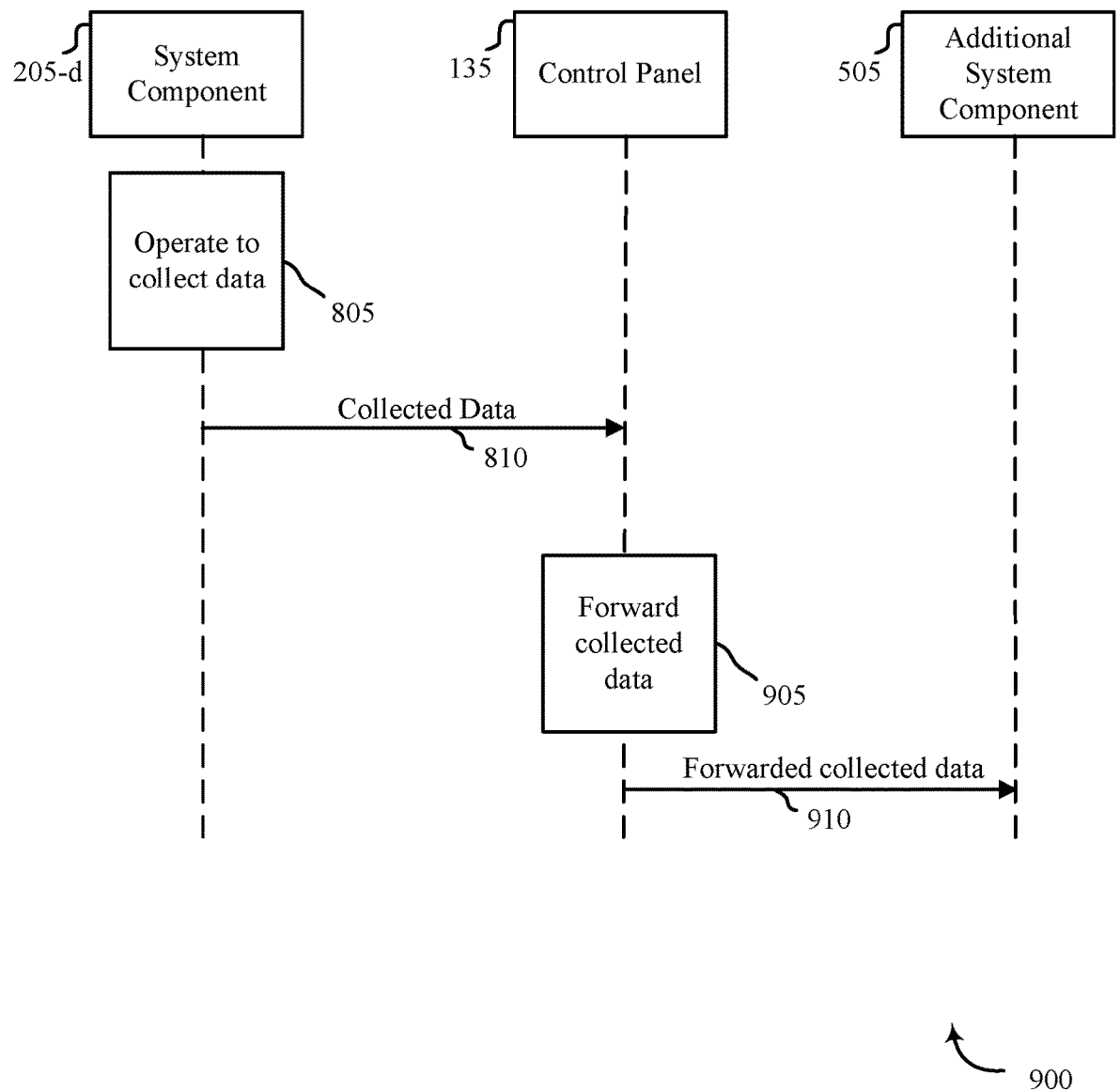
FIG. 9 shows a block diagram of an apparatus relating to a security and/or an automation system, in accordance with various aspects of this disclosure.

FIG. 9 shows a block diagram for an apparatus relating to a security and/or an automation system, in accordance with various aspects of this disclosure. The apparatus 900 includes system component 205-*d*, which may be one example of the system components 205 described with reference to FIGS. 2-7, a control panel 135, which may be one example of the electronic device 510 described with reference to FIGS. 1 and 5, and an electronic device 510, which may be one example of the electronic device 510 described with reference to FIGS. 5-7.

The additional system component 505 may include, for example, a duplicate of the system component 205-*d*. In other embodiments, additional system component 505 may include the same or similar features as system component 205-*d* and may facilitate, for example, an intercom communication between various locations of a property being monitored by the security and/or automation system.

System component 205-*d* may operate to collect data at block 805. The collected data 810 may be transmitted to control panel 135. Control panel 135 may forward the collected data at block 905. The forwarded collected data 910 may be transmitted to additional system component 505. In this manner, control panel 135 may function as a feed-through device with limited or no processing of the collected data 810. In some embodiments, control panel 135 may process the collected data 810 to determine whether to generate other commands, instructions, or the like in response to the collected data 810 for operation of other components or aspects of the security and/or automation system.

The apparatus 900 may be well-suited for an intercom system. In at least some examples, the system component 205-*d*, control panel 135 and additional system component 505 may be connected to each other via an electrical wiring network of a building that provides power to each of system component 205-*d*, control panel 135 and additional system component 505. In other embodiments, the components of apparatus 900 may communicate with each other wirelessly, or a combination of wired and wireless communications.

Figure 10:
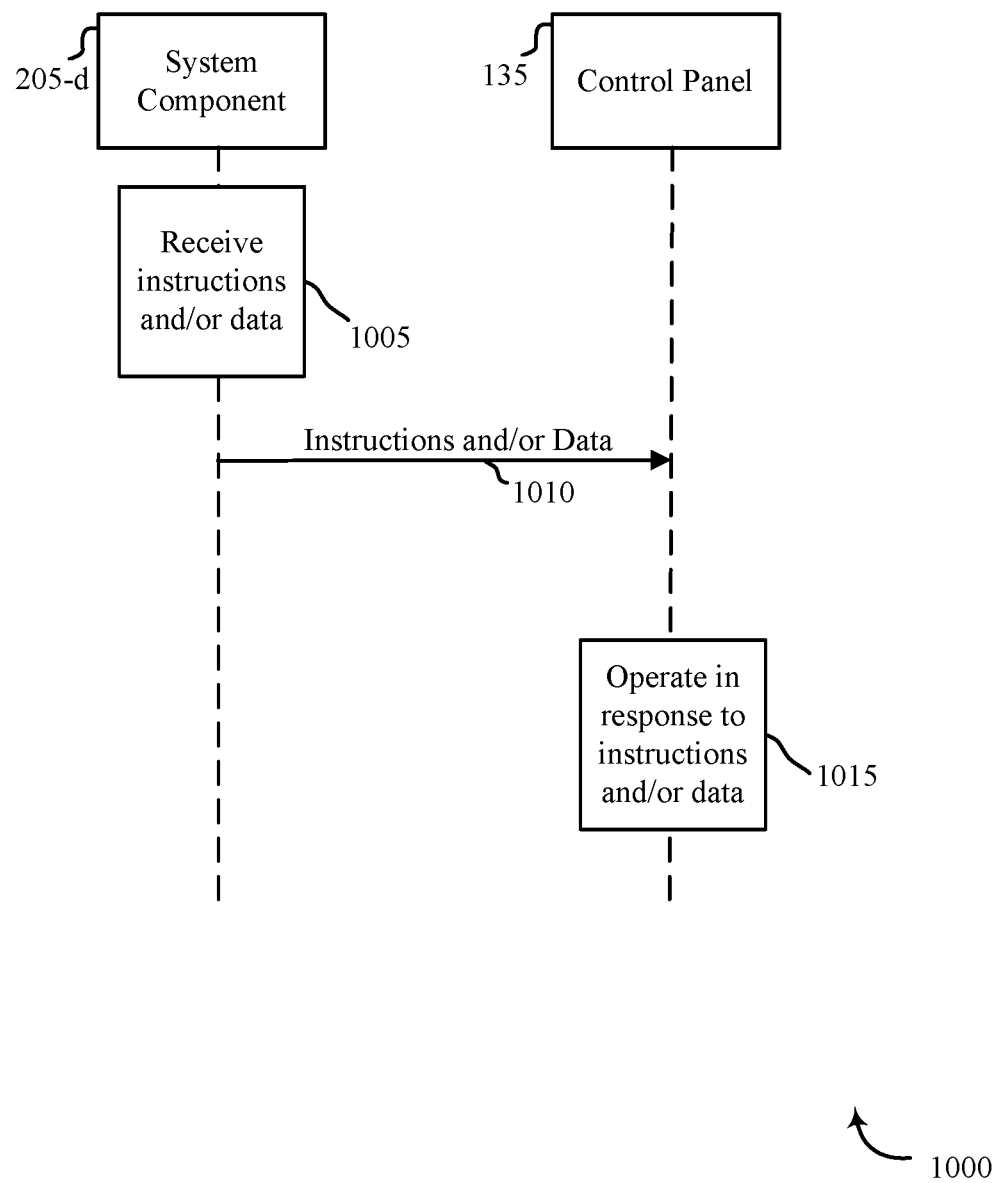
FIG. 10 shows a block diagram of an apparatus relating to a security and/or an automation system, in accordance with various aspects of this disclosure.

FIG. 10 is a block diagram of an apparatus 1000 relating to a security and/or an automation system, in accordance with various aspects of this disclosure. Apparatus 1000 includes system component 205-*d*, which may be one example of the system components 205 described with reference to FIGS. 2-7, and a control panel 135, which may be one example of the electronic device 510 described with reference to FIGS. 1 and 5.

System component 205-*d* receives instructions and/or data at block 1005. The instructions and/or data 1010 are delivered to control panel 135. Control panel 135 operates in response to the instructions and/or data at block 1015. The instructions and/or data 1010 may be in the form of a voice command that relates to operation of one or more features or functions of control panel 135. The instructions and/or data 1010 may have other forms such as, for example, sensor data, a video stream, commands associated with a user input to a touch screen, and the like. System component 205-*d* and control panel 135 may be connected via, for example, electrical wiring of the building. Additionally, or alternatively, system component 205-*d* and control panel 135 may communicate with each other via wireless communications or wired communications that are separate from the electrical wiring system used to power system component 205-*d* and control panel 135.

System component 205-*d* may conduct other functions in other blocks (not shown) including, for example, providing a confirmation response to a user or device from which the instructions and/or data 1010 are received prior to transmitting the instructions and/or data 1010 to control panel 135.

Figure 11:
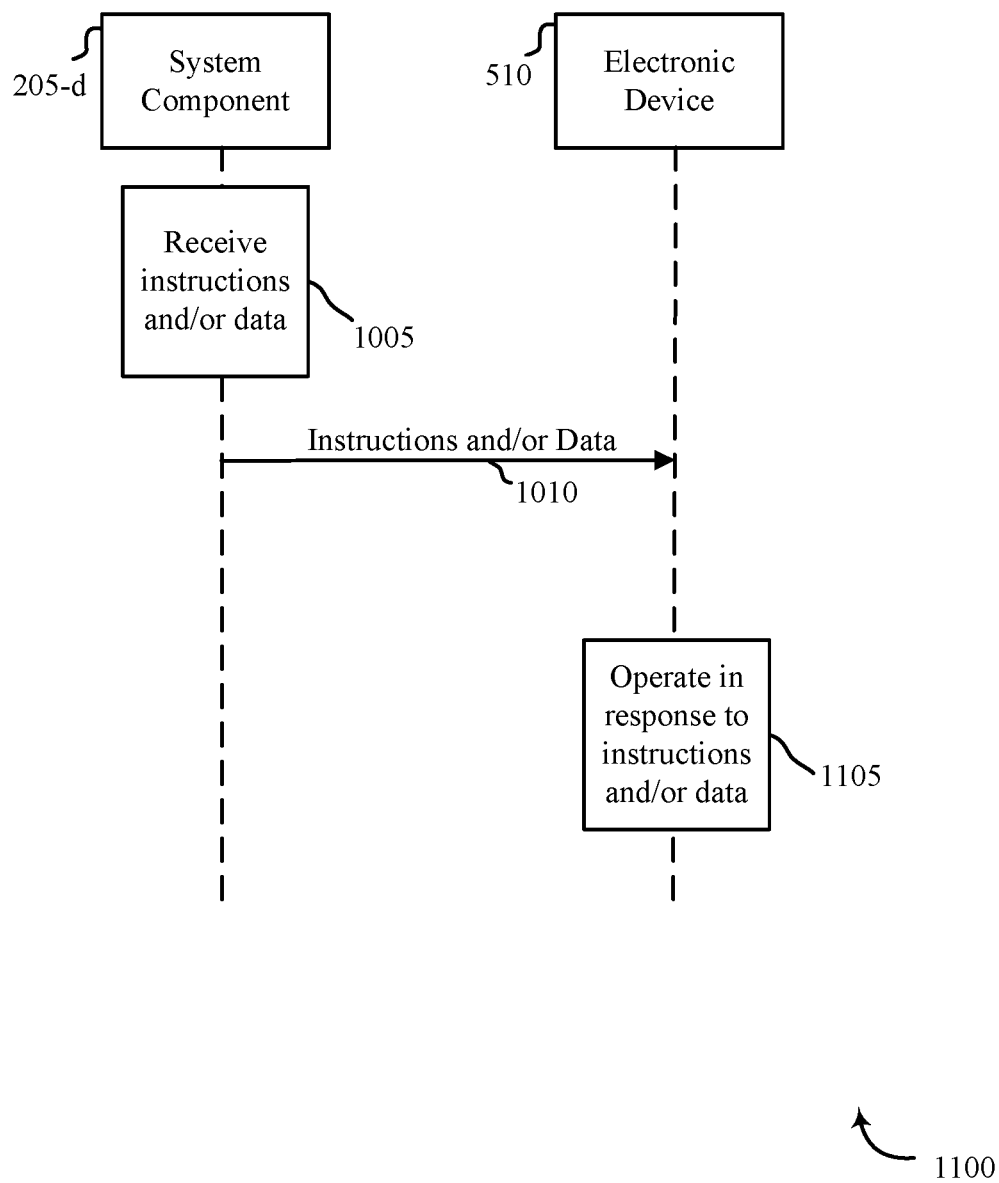
FIG. 11 shows a block diagram of an apparatus relating to a security and/or an automation system, in accordance with various aspects of this disclosure.

FIG. 11 shows a block diagram of an apparatus 1100 related to a security and/or an automation system, in accordance with various aspects of this disclosure. Apparatus 1100 includes a system component 205-*d*, which may be one example of the system components 205 described with reference to FIGS. 2-7, and an electronic device 510, which may be one example of the electronic device 510 described with reference to FIGS. 5-7.

In at least some examples, system component 205-*d* and electronic device 510 are combined as a single integrated device. In other examples, system component 205-*d* and electronic device 510 are housed in a common housing, or mounted in a common storage structure such as an electrical box in the wall of a building. System component 205-*d* and electronic device 510 may be connected to electrical wiring of the building. The electrical wiring may provide power for operating system component 205-*d* and electronic device 510. The electrical wiring may also provide a communication medium for transferring information between system component 205-*d* and electronic device 510 or other components of the security and/or automation system (e.g., a control panel or other system components).

System component 205-d may receive instructions and/or data in a block 1005. The instructions and/or data 1010 may be transferred to electronic device 510. Electronic device 510 may operate in response to the instructions and/or data in block 1105. In one example, the instructions and/or data relates to control of electrical power to the electronic device 510. In one example, the instructions and/or data 1010 relates to operating electronic device 510 (e.g., turning on or off a switch).

Figure 12:
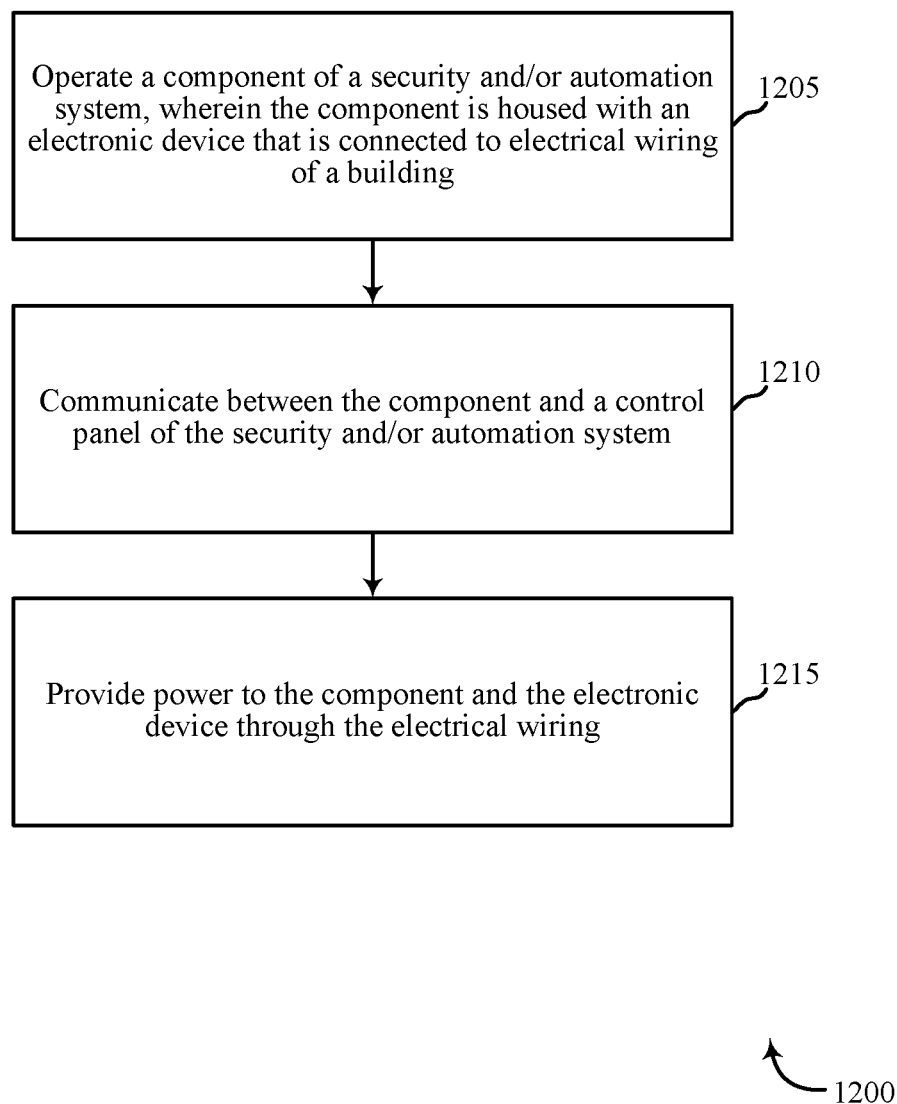
FIG. 12 is a flow chart illustrating an example of a method relating to a security and/or an automation system, in accordance with various aspects of this disclosure.

FIG. 12 is a flow chart illustrating an example of a method 1200 for implementing an integrated device, in accordance with various aspects of the present disclosure. For clarity, the method 1200 is described below with reference to aspects of one or more of the components 205 described with reference to FIGS. 2-11, and/or aspects of one or more of the component modules 215 described with reference to FIGS. 2-5 and 7. In some examples, a control panel or other component of a communication system may execute one or more sets of codes to control the functional elements of the component and/or component module to perform the functions described below. Additionally or alternatively, the control panel or other system component may perform one or more of the functions described below using special-purpose hardware.

The operations at block 1205, 1210, 1215 may be performed using, for example, the component module 215 described with reference to FIGS. 2-5 and 7.

The block 1205 of method 1200 includes operating a component of a security and/or automation system, wherein the component is housed with an electronic device that is connected to electrical wiring of a building. Block 1210 includes communicating between the component and a control panel of the security and/or automation system. Block 1215 includes providing power to the components and electronic device through the electrical wiring.

Additionally, or alternatively, the component may include a speaker and a microphone, and communicating may include transmitting an audio message. The electronic device may be one of a power outlet and a light switch, and the component may be integrated into a common housing with the electronic device. The method 1200 may include receiving voice commands via the component.

The component may include at least one sensor, and the method 1200 may include operating the electronic device in response to sensor data received from the sensor. The component may include at least one of a camera, a motion sensor, a microphone, a speaker, an infrared sensor, a microprocessor, memory, a wireless transmitter, and a wireless receiver. Communicating may include transmitting data through the electrical wiring. Communicating may include transmitting data wirelessly. The method 1200 may include communicating with another component of the security and/or automation system either wirelessly or through the electrical wiring.

Thus, the method 1200 may provide for voice commands, intercom functions, communications via electrical wiring of a building, and/or integrating components into an existing electronic device such as a power outlet or light switch, any of which may relate to automation/security systems. It should be noted that the method 1200 is just one implementation and that the operations of the method 1200 may be rearranged or otherwise modified such that other implementations are possible.

Figure 13:
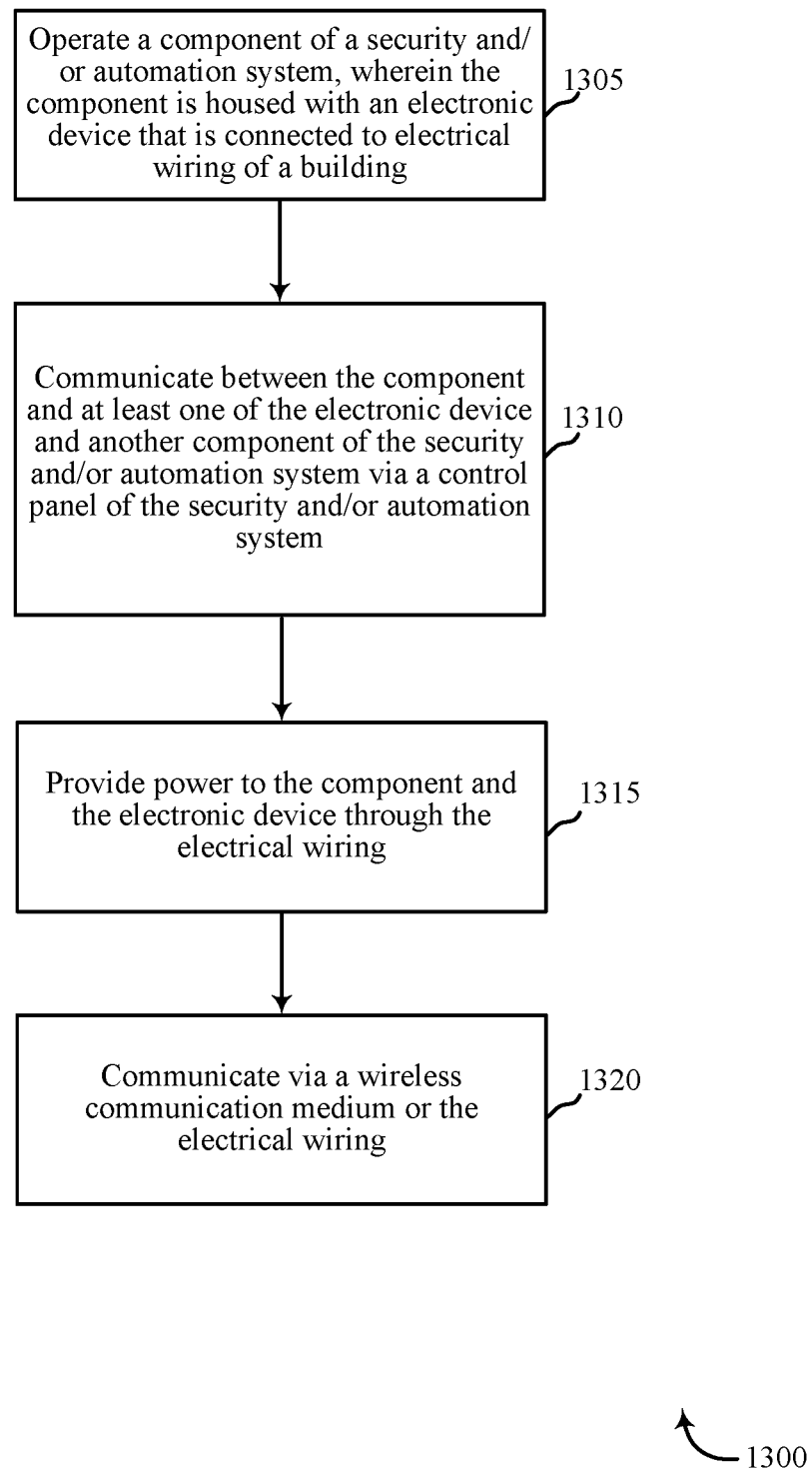
FIG. 13 is a flow chart illustrating an example of a method relating to a security and/or an automation system, in accordance with various aspects of this disclosure.

FIG. 13 is a flow chart illustrating an example of a method 1300 for implementing an integrated device, in accordance with various aspects of the present disclosure. For clarity, the method 1300 is described below with reference to aspects of one or more of the components 205 described with reference to FIGS. 2-11, and/or aspects of one or more of the component modules 215 described with reference to FIGS. 2-5 and 7. In some examples, a control panel or other component of a communication system may execute one or more sets of codes to control the functional elements of the component and/or component module to perform the functions described below. Additionally, or alternatively, the control panel or other system component may perform one or more of the functions described below using special-purpose hardware.

At block 1305, the method 1300 includes operating a component of a security and/or automation system, wherein the component is housed with an electronic device that is connected to electrical wiring of a building. Block 1310 includes communicating between the component and at least one of the electronic device and another component of the security and/or automation system via a control panel of the security and/or automation system. Block 1315 includes providing power to the component and the electronic device through the electrical wiring. Block 1320 includes communicating via a wireless communication medium or the electrical wiring.

The operations at block 1305, 1310, 1315, 1320 may be performed, for example, using the component module 215 described with reference to FIGS. 2-5 and 7. Thus, the method 1300 may provide for voice commands, intercom functions, communications via electrical wiring of a building, and/or integrating components into an existing electronic device such as a power outlet or light switch, any of which may relate to automation/security systems. It should be noted that the method 1300 is just one implementation and that the operation of the method 1300 may be rearranged or otherwise modified such that other implementations are possible.

In some examples, aspects from two or more of the methods 1200, 1300 may be combined and/or separated. It should be noted that the methods 1200, 1300 are just example implementations, and that the operations of the methods 1200, 1300 may be rearranged or otherwise modified such that other implementations are possible.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:
1. A method for implementing a security and/or automation system, comprising:
 identifying, at a first component of the security and/or automation system housed with an electronic device that is connected to electrical wiring of a building associated with the security and/or automation system, a voice command from a user of the security and/or automation system;

communicating a first audible message to the user of the security and/or automation system repeating the identified voice command;

receiving, from the user of the security and/or automation system, a confirmation of the identified voice command based at least in part on communicating the first audible message;

determining an identity of the user of the security and/or automation system based at least in part on the identified voice command and a voice profile indicating a characteristic of the user;

generating, by the first component, instructions corresponding to the voice command based at least in part on receiving the confirmation of the identified voice command and determining the identity of the user; and communicating the instructions from the first component to a second component of the security and/or automation system.

2. The method of claim 1, further comprising:
identifying, at the first component, a second audible message spoken by the user; and
communicating the second audible message to the second component based at least in part on the instructions corresponding to the voice command, wherein the instructions indicate for the second audible message to be played by a speaker at the second component.

3. The method of claim 2, wherein communicating the second audible message to the second component further comprises:
communicating the second audible message to the second component wirelessly.

4. The method of claim 2, wherein communicating the second audible message to the second component further comprises:
communicating the second audible message to the second component over the electrical wiring.

5. The method of claim 1, wherein communicating the first audible message to the user comprises transmitting the first audible message to a mobile device carried by the user.

6. The method of claim 1, wherein communicating the first audible message to the user comprises providing the first audible message, by a speaker of the first component, to the user.

7. The method of claim 1, further comprising:
determining that the voice command is included within a set of commands associated with the identity of the user, wherein generating the instructions is based at least in part on the determination that the voice command is included within the set of commands.

8. The method of claim 1, wherein:
the voice command indicates a change in operation of the second component; and
communicating the instructions to the second component enables the second component to carry out the change in operation.

9. The method of claim 1, further comprising:
providing power to the electronic device through the electrical wiring based at least in part on the communicating the instructions between the first component and the second component.

10. The method of claim 1, further comprising:
receiving the voice command from a microphone of the first component.

11. The method of claim 1, further comprising:
receiving the voice command from a device positioned remotely from the first component, the device associated with the security and/or automation system.

12. An apparatus for security and/or automation systems, comprising:
a processor;
memory in electronic communication with the processor; and
instructions stored in the memory, the instructions being executable by the processor to:
identify, at a first component of the security and/or automation system housed with an electronic device that is connected to electrical wiring of a building associated with the security and/or automation system, a voice command from a user of the security and/or automation system;
communicate a first audible message to the user of the security and/or automation system repeating the identified voice command;
receive, from the user of the security and/or automation system, a confirmation of the identified voice command based at least in part on communicating the first audible message;
determine an identity of the user of the security and/or automation system based at least in part on the identified voice command and a voice profile indicating a characteristic of the user;
generate, by the first component, instructions corresponding to the voice command based at least in part on receiving the confirmation of the identified voice command and determining the identity of the user; and
communicate the instructions corresponding to the voice command from the first component to a second component of the security and/or automation system.

13. The apparatus of claim 12, wherein the instructions stored in the memory are further executable by the processor to:
identify, at the first component, a second audible message spoken by the user; and
communicate the second audible message to the second component based at least in part on the instructions corresponding to the voice command, wherein the instructions corresponding to the voice command indicate for the second audible message to be played by a speaker at the second component.

14. The apparatus of claim 12, wherein the instructions stored in the memory are further executable by the processor to:
determine that the voice command is included within a set of commands associated with the identity of the user, wherein generating the instructions corresponding to the voice command is based at least in part on the determination that the voice command is included within the set of commands.

15. The apparatus of claim 12, wherein:
the voice command indicates a change in operation of the second component; and
communicating the instructions corresponding to the voice command to the second component enables the second component to carry out the change in operation.

16. The apparatus of claim 12, wherein the instructions stored in the memory are further executable by the processor to:
provide power to the electronic device through the electrical wiring based at least in part on the communicating the instructions corresponding to the voice command between the first component and the second component.

17. The apparatus of claim 12, wherein the instructions stored in the memory are further executable by the processor to:

receive the voice command from a microphone of the first component.

18. A non-transitory computer-readable medium storing computer-executable code at a first component of a security and/or automation systems, the code executable by a processor to:

identify, at the first component of the security and/or automation system housed with an electronic device that is connected to electrical wiring of a building associated with the security and/or automation system, a voice command from a user of the security and/or automation system;

communicate a first audible message to the user of the security and/or automation system repeating the identified voice command;

receive, from the user of the security and/or automation system, a confirmation of the identified voice command based at least in part on communicating the first audible message;

determine an identity of the user of the security and/or automation system based at least in part on the identified voice command and a voice profile indicating a characteristic of the user;

generate, by the first component, instructions corresponding to the voice command based at least in part on receiving the confirmation of the identified voice command and determining the identity of the user; and communicate the instructions from the first component to a second component of the security and/or automation system.

* * * * *